US009326271B2

(12) United States Patent
Zhao et al.

(10) Patent No.: US 9,326,271 B2
(45) Date of Patent: Apr. 26, 2016

(54) METHOD AND DEVICE FOR DATA TRANSMISSION BASED ON CARRIER AGGREGATION (CA) TECHNOLOGY

(75) Inventors: Yali Zhao, Beijing (CN); Fangli Xu, Beijing (CN); Jing Liang, Beijing (CN)

(73) Assignee: Datang Mobile Communications Equipment Co., Ltd. (CN)

( * ) Notice: Subject to any disclaimer, the term of this patent is extended or adjusted under 35 U.S.C. 154(b) by 159 days.

(21) Appl. No.: 13/996,607

(22) PCT Filed: Dec. 15, 2011

(86) PCT No.: PCT/CN2011/084040
§ 371 (c)(1),
(2), (4) Date: Jun. 21, 2013

(87) PCT Pub. No.: WO2012/083811
PCT Pub. Date: Jun. 28, 2012

(65) Prior Publication Data
US 2013/0279377 A1  Oct. 24, 2013

(30) Foreign Application Priority Data

Dec. 22, 2010  (CN) .......................... 2010 1 0601856

(51) Int. Cl.
H04W 72/04 (2009.01)
H04L 5/00 (2006.01)
H04L 5/14 (2006.01)
H04W 74/00 (2009.01)

(52) U.S. Cl.
CPC ............... *H04W 72/04* (2013.01); *H04L 5/001* (2013.01); *H04L 5/0037* (2013.01); *H04L 5/1469* (2013.01); *H04W 74/002* (2013.01)

(58) Field of Classification Search
None
See application file for complete search history.

(56) References Cited

U.S. PATENT DOCUMENTS

| 2009/0274086 | A1  | 11/2009 | Petrovic et al. |          |
|--------------|-----|---------|-----------------|----------|
| 2012/0106404 | A1* | 5/2012  | Damnjanovic     | 370/279  |
| 2012/0281601 | A1* | 11/2012 | Kuo et al.      | 370/280  |
| 2012/0314640 | A1* | 12/2012 | Kim et al.      | 370/311  |
| 2012/0327821 | A1* | 12/2012 | Lin et al.      | 370/280  |

(Continued)

FOREIGN PATENT DOCUMENTS

| CN | 101772220 A | 7/2010  |
|----|-------------|---------|
| CN | 101902773 A | 12/2010 |
| CN | 102075949 A | 5/2011  |

OTHER PUBLICATIONS

3GPP TSG RAN WG1 #66bis, R1-113082, Zhuhai, China, Oct. 10-14, 2011, SMASUNG, "Data scheduling with different TDD UL-DL configurations".*

*Primary Examiner* — Chi H Pham
*Assistant Examiner* — Vladislav Agureyev
(74) *Attorney, Agent, or Firm* — DLA Piper LLP (US)

(57) ABSTRACT

The present invention discloses a method and device for data transmission based on carrier aggregation (CA) technology. The method and device are used for ensuring that user equipments can work normally, when the multiple cells aggregated from the user equipments supporting CA technology have different time division duplex (TDD) uplink/downlink (UL/DL) configurations. The method includes: a base station configures at least two time division duplex uplink/downlink carrier TDD UL/DL configuration collections for the user equipments, wherein each TDD UL/DL configuration collection includes at least one cell; the base station respectively configures one cell in each TDD UL/DL configuration collection to be an especial cell (Ecell).

17 Claims, 4 Drawing Sheets

(56) References Cited

U.S. PATENT DOCUMENTS

| | | |
|---|---|---|
| 2013/0028149 A1* | 1/2013 | Chen et al. .................... 370/280 |
| 2013/0034029 A1* | 2/2013 | Lee .............................. 370/280 |
| 2013/0051288 A1* | 2/2013 | Yamada et al. ............... 370/280 |
| 2013/0155898 A1* | 6/2013 | Yin et al. ....................... 370/254 |
| 2013/0188535 A1* | 7/2013 | Seo et al. ...................... 370/280 |
| 2013/0223296 A1* | 8/2013 | Zeng et al. .................... 370/280 |
| 2013/0235804 A1* | 9/2013 | Kwon et al. ................... 370/328 |
| 2014/0010128 A1* | 1/2014 | He et al. ....................... 370/280 |
| 2014/0192687 A1* | 7/2014 | Kim et al. ..................... 370/280 |

* cited by examiner

METHOD AND DEVICE FOR DATA TRANSMISSION BASED ON CARRIER AGGREGATION (CA) TECHNOLOGY

This application is a US National Stage of International Application No. PCT/CN2011/084040, filed Dec. 15, 2011, designating the United States, and claiming the benefit of Chinese Patent Application No.: 201010601856.6, filed with the Chinese Patent Office on Dec. 22, 2010 and entitled "Carrier aggregation based data transmission method and apparatus," both of which are hereby incorporated by reference in their entireties.

FIELD

The present invention relates to the field of communications and particularly to a Carrier Aggregation (CA) based data transmission method and apparatus.

BACKGROUND

At present, required peak rates of up to 1 Gbps in the downlink and 500 Mbps in the uplink in a Long Term Evolution-Advanced (LTE-A) system have been significantly improved as compared to a Long Term Evolution (LTE) system while requiring good compatibility of the LTE-A system with the LTE system. Thus Carrier Aggregation (CA) has been introduced to the LTE-A system so as to accommodate the required improved peak rates, compatibility with the LTE system and full use of spectrum resources.

The CA technology refers to that a user equipment is configured by the network side with a plurality of cells so that the user equipment can operate on the plurality of cells simultaneously, where a cell includes a pair of uplink and downlink (UL and DL) Component Carriers (CCs) or only a DL CC. To the contrary, a user equipment is configured with only one cell in the LTE system and earlier wireless communication systems. In the CA-enabled LTE-A system, respective CCs can be spectrally consecutive or inconsecutive, and the respective CCs can have the same or different bandwidths, and in order to maintain compatibility with the LTE system, there is a limited maximum bandwidth of 20 MHz per CC. At present a user equipment is generally configured with five cells at most.

Moreover carrier-aggregated cells are further categorized as follows in LTE-A:

A Primary Cell (PCell) refers to the only one cell defined as a PCell among a plurality of aggregated cells configured for a UE.

A Secondary Cell (SCell) refers to all the other cells than the PCell among the plurality of aggregated cells configured for the UE.

The PCell is selected at the network side and configured for the user equipment by RRC signaling, and different user equipments can have different PCells. As specified in the LTE R10 version, the difference between the PCell and the SCell lies in that the PCell is bound with a variety of functions, where the following general functions are bound with the PCell:

A Physical Uplink Control Channel (PUCCH) is configured only for the PCell to transmit a Channel State Indicator (CSI), Hybrid Automatic Repeat reQuest (HARM) Acknowledgement/Non-acknowledgement (ACK/NACK) feedback information and a Dedicated Scheduling Request (DSR);

The downlink of the PCell can act as a UL timing reference for a random access;

The PCell can act as a pathloss reference for the PCell and the other SCells;

A random access can be performed only in the PCell;

A Semi-Persistent Scheduling (SPS) resource can be configured only in the PCell; and A Radio Link Failure (RLF) of the user equipment can be judged only if there is an RLF occurring in the PCell.

As specified in the R8/9 versions, the following seven UL/DL configurations as depicted in Table 1 are defined for a Time Division Duplex (TDD) system in the physical layer standard, where D represents a DL subframe, U represents a UL subframe, S represents a special subframe of the TDD system, and configuration # "0-6" correspond respectively to the seven UL/DL configurations. For example, the configuration # "2" represents ten subframes included in a frame, which are configured respectively as "D, S, U, D, D, D, S, U, D, D".

TABLE 1

| UL/DL | Subframe number# | | | | | | | | | |
|---|---|---|---|---|---|---|---|---|---|---|
| Configuration# | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Along with technological development, as specified in the R11 version, a user equipment configured with aggregated cells in the LTE-A system can share or use an adjacent band with another system (e.g., the LTE system), and referring to FIG. 1, for example, a user equipment is configured with three aggregated cells including a cell 1, a cell 2 and a cell 3 in the LTE-A system, where the cell 1 and the cell 2 use the same band, i.e., Band 1, and the cell 3 uses a band, i.e., Band 2. In order to avoid uplink and downlink cross interference in the TDD system, the Band 1 and the adjacent TDD band A in a 3G/LTE (3G system or LTE system) have to use TDD UL/DL configurations that can coexist with each other, where the so-called TDD UL/DL configurations that can coexist with each other refer to TDD UL/DL configurations without UL/DL cross interference, that is, the same TDD UL/DL configuration for the LTE system; and the Band 2 and the corresponding 3G/LTE TDD Band B have to use TDD UL/DL configurations that can coexist with each other. If the Band A and the Band B use different TDD UL/DL configurations, then the Band 1 and the Band 2 also use different TDD UL/DL configurations.

However the existing LTE-A system has been designed based on the R10 version, and as specified in the R10 version, only intra-band CA (i.e., carrier aggregation within the same band) is supported in the UL in a CA scenario, so the pathloss reference for transmission over a UL CC can be defined as the DL CC corresponding to the UL CC, which is broadcasted in a broadcast message, or the DL CC of a PCell. The DL CC of the PCell can be defined as the pathloss reference because the UL CC of a user equipment and the UL CC of the PCell of the user equipment are in the same band as specified in the R10 version, thus the pathloss is similar.

Also as defined in the R10 version, a Discontinuous Reception (DRX) mechanism refers to that aggregated cells for a user equipment have the same Active Time. The so-called Active Time refers to a period of time for which the user equipment has to listen to the control channel. Referring to FIG. 2, an On Duration represents a period of time for which a UE listens to the control channel, when the radio frequency channel is opened and the control channel is listened to continuously, and the On Duration typically periodically occurs (i.e., a DRX cycle), and a specific cycle is configured by an eNB.

As can be apparent from the foregoing description, a carrier aggregation-enabled user equipment in R11 supports different TDD UL/DL configurations, and if R10 specification is directly applied to R11, it may result in the following numerous problems.

1. If a user equipment is configured with a plurality of aggregated cells based on the CA technology and each cell uses a different TDD UL/DL configuration, and if there is a large interval between bands corresponding to the respective cells, as illustrated in FIG. 1, for example, the cell 1 and the cell 2 correspond to the Band 1, and the cell 3 corresponds to the Band 2, then the pathloss condition of the PCell can not be regarded as the pathloss reference of any other SCell regardless of which cell of the cell 1, the cell 2 and the cell 3 is the PCell.

2. As specified in the R10 version, a user equipment only reads broadcast information on the PCell and the system information of the other SCells is notified by dedicated signaling, but existing dedicated signaling to indicate system information of an SCell does not indicate the TDD UL/DL configuration of this SCell and its TDD UL/DL configuration is regarded same as the PCell by default, so the existing R10 mechanism can not support the use of different TDD UL/DL configurations respectively for a plurality of different cells aggregated for a user equipment.

3. If a user equipment is configured with a plurality of aggregated cells based on the CA technology and each cell uses a different TDD UL/DL configuration, then there may be a resource waste if there is an cross-carrier scheduling relationship between the cells with different TDD UL/DL configurations.

Referring to FIG. 1 and FIG. 3, for example, if there are different TDD UL/DL configurations in cell 1 and cell 2, and cell 1 can cross-carrier schedule cell 2 which is indicated by a higher layer, then cell 2 will be a cell with only Physical Downlink Shared Channel (PDSCH), that is, no PDCCH to schedule the user equipment is borne in cell 2, and thus as illustrated in FIG. 3 and as specified in the R10 version, for cross-carrier scheduling, the cell 1 can schedule the downlink of subframe 0 and the uplink of subframe 4 of cell 1 and the downlink of subframe 0 and the uplink of subframe 4 of the cross-carrier scheduled cell 2 in subframe 0, But the TDD UL/DL configuration of subframe 4 in cell 2 is downlink, thus the subframe 4 of cell 2 cannot be scheduled by subframe 0 of cell 1 because downlink subframe can only be scheduled by itself, which will result the resource waste of cell 2 in certain subframes.

4. As specified in the R10 version, when a plurality of cell configured for a user equipment based on the CA technology transmit data in the same subframe, their corresponding Hybrid Automatic Repeat Request (HARQ) ACK/NACK information is fed back at the same instance of time. As specified in the R11 version, different cells configured for a user equipment can use different TDD UL/DL configurations, so when the different cells configured for the user equipment transmit data in the same subframe, their corresponding HARQ ACK NACK information is fed back at different instances of time, thus complicating a PUCCH design.

Referring to FIG. 1 and FIG. 4, for example, the Band 1 uses a TDD UL/DL configuration with the configuration #0, and the Band 2 use a TDD UL/DL configuration with the configuration #2, and if both the Band 1 and the Band 2 have a DL PDSCH transmitted at the same instance of time (in the subframe 0), then ACK information corresponding to PDSCH transmission in the Band 1 and the Band 2 is fed back at different instances of time, thus complicating a PUCCH design.

As can be apparent the use of different TDD UL/DL configurations for a plurality of different cells aggregated for a user equipment actually can not be supported in the prior art, and it is thus desirable in the R11 version to introduce a new mechanism so as to ensure normal operation of the system even in this situation.

SUMMARY

Embodiments of the invention provide a Carrier Aggregation (CA) based data transmission method and apparatus so as to ensure normal operation of a user equipment in the case of different TDD UL/DL configurations for a plurality of cells aggregated for the user equipment.

Particular technical solutions according to the embodiments of the invention are as follows:

A Carrier Aggregation (CA) based data transmission method includes:

an eNB configuring a user equipment with at least two Time Division Duplex Uplink and Downlink, TDD UL/DL, configuration sets each of which includes at least one cell; and the eNB configuring a cell respectively in each TDD UL/DL configuration set as an Especial Cell, Ecell.

A Carrier Aggregation (CA) based data transmission method includes:

a user equipment determining at least two Time Division Duplex Uplink and Downlink, TDD UL/DL, configuration sets, which are configured for the user equipment by an eNB, according to a notification from the eNB, wherein each TDD UL/DL configuration set includes at least one cell;

the user equipment configuring a cell respectively in each TDD UL/DL configuration set as an Especial Cell, Ecell, according to the notification from the eNB or a rule predefined by the eNB and the user equipment; and the user equipment transmitting data with the eNB based on each TDD UL/DL configuration set and its corresponding Ecell.

A Carrier Aggregation (CA) based data transmission apparatus includes:

a first configuring unit configured to configure a user equipment with at least two Time Division Duplex Uplink and Downlink, Duplex TDD UL/DL, configuration sets, wherein each TDD UL/DL configuration set includes at least one cell; and a second configuring unit configured to configure a cell respectively in each TDD UL/DL configuration set as an Especial Cell, Ecell.

A Carrier Aggregation (CA) based data transmission apparatus includes:

a first determining unit configured to determine at least two Time Division Duplex Uplink and Downlink, TDD UL/DL, configuration sets, which are configured for a current user equipment by an eNB, according to a notification from the eNB, wherein each TDD UL/DL configuration set includes at least one cell;

a second determining unit configured to configure a cell respectively in each TDD UL/DL configuration set as an Especial Cell, Ecell, according to the notification from the eNB or a rule predefined by the eNB and the user equipment; and a communicating unit configured to transmit data with the eNB based on each TDD UL/DL configuration set and its corresponding Ecell.

In the embodiments of the invention, the concept of TDD UL/DL configuration set has been introduced, and also the concept of Ecell has been introduced for each TDD UL/DL configuration set, where each TDD UL/DL configuration set can include one or more cells, and there is an Ecell configured in each TDD UL/DL configuration set to have all or a part of functions of a PCell, so that the user equipment can transmit data with the eNB based on each TDD UL/DL configuration set and its corresponding Ecell. Thus the Ecell can be used reasonably to thereby ensure normal operation of the user equipment and hence normal operation of the system when there are different TDD UL/DL configurations for a plurality of cells aggregated for the user equipment.

DETAILED DESCRIPTION OF THE EMBODIMENTS

In order to support a smooth application of rules defined in the R11 version to an LTE-A system supporting the R10 version, that is, in order to ensure normal operation of the LTE-A system when a user equipment in the system uses different TDD UL/DL configurations respectively for a plurality of cells aggregated for the user equipment, embodiments of the invention introduce the concept of TDD UL/DL configuration set and also the concept of Especial Cell (Ecell) for each TDD UL/DL configuration set, where each TDD UL/DL configuration set can include one or more cells, and there is an Ecell configured in each TDD UL/DL configuration set to have all or a part of functions of a PCell, so that the user equipment transmits data with an eNB based on the respective TDD UL/DL configuration sets and their corresponding cells.

Preferred embodiments of the invention will be detailed below with reference to the drawings.

Figure 5:
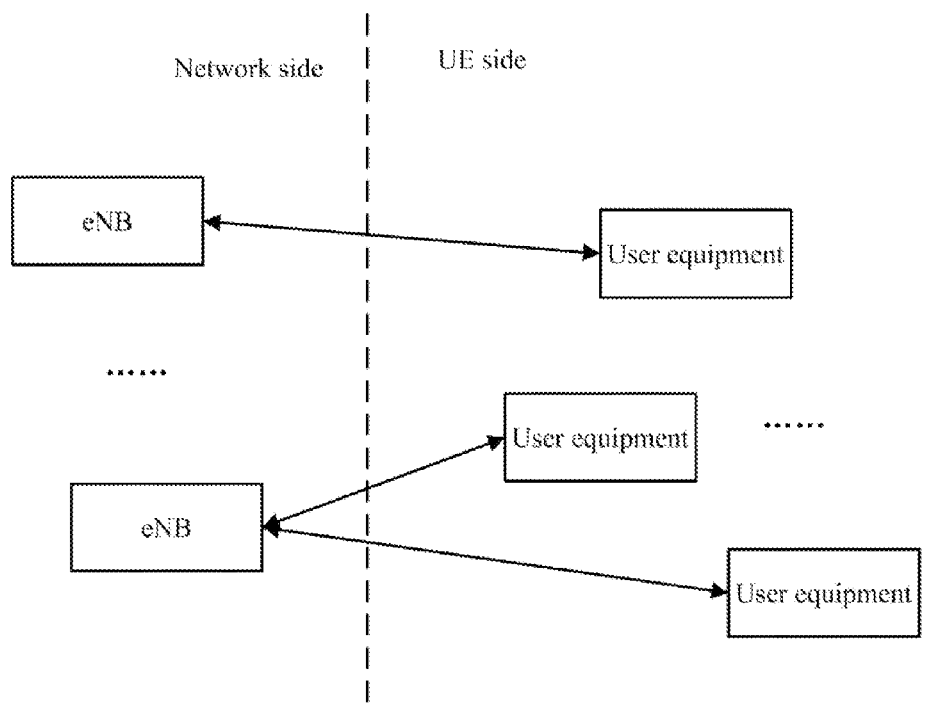
FIG. 5 is an architectural diagram of an LTE-A system according to an embodiment of the invention.
Figure 6:
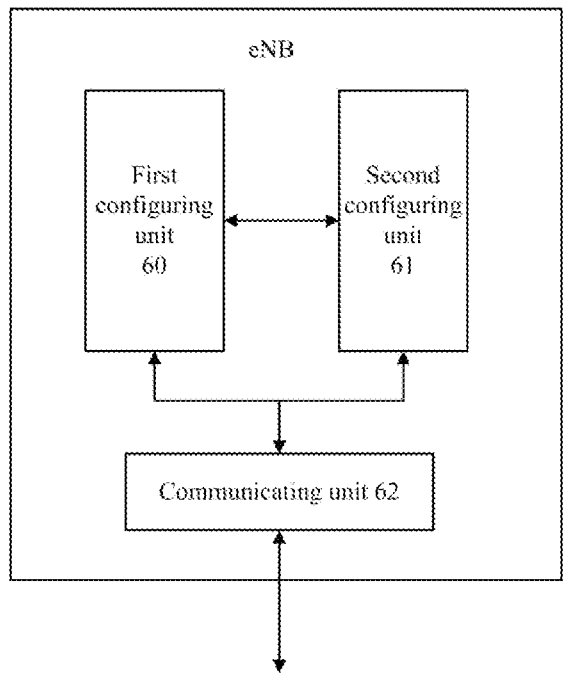
FIG. 6 is a functional structural diagram of an eNB according to an embodiment of the invention.
Figure 7:
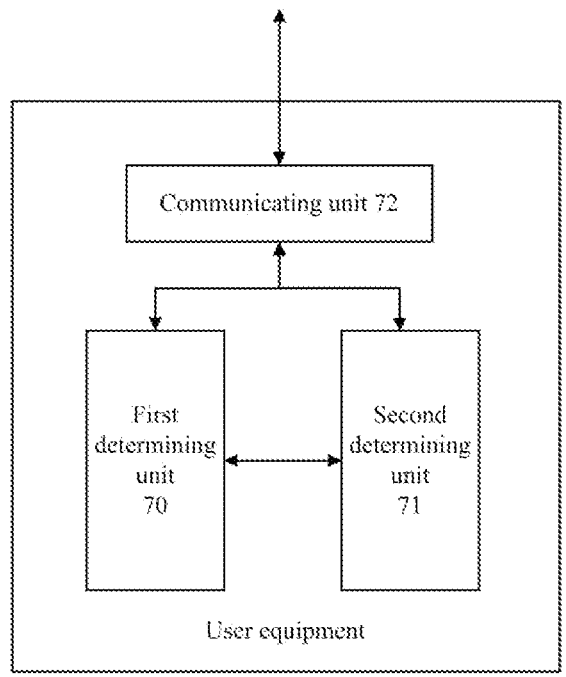
FIG. 7 is a functional structural diagram of a user equipment according to an embodiment of the invention.

Referring to FIG. 5, FIG. 6 and FIG. 7, an LTE-A system includes several eNBs and user equipments in an embodiment of the invention.

The eNB includes a first configuring unit 60 and a second configuring unit 61, where:

The first configuring unit 60 is configured to configure the user equipment with at least two TDD UL/DL configuration sets, where each TDD UL/DL configuration set includes at least one cell; and The second configuring unit 61 is configured to configure an Ecell respectively among cells included in each TDD UL/DL configuration set.

Preferably the eNB further includes:

a communicating unit 62 configured to notify the user equipment of the at least two TDD UL/DL configuration sets and the Ecells configured in the respective TDD UL/DL configuration sets.

The user equipment includes a first determining unit 70, a second determining unit 71 and a communication unit 72, where:

The first determining unit 70 is configured to determine the at least two TDD UL/DL configuration sets, which are configured for the user equipment by the eNB, according to a notification from the eNB, where each TDD UL/DL configuration set includes at least one cell;

The second determining unit 71 is configured to determine an Ecell respectively among the respective cells included in each TDD UL/DL configuration set from the notification from the eNB or a rule predefined by the eNB and the user equipment; and The communicating unit 72 is configured to transmit data with the eNB based on the respective TDD UL/DL configuration sets and their corresponding Ecells.

Preferably the user equipment further includes:

a capability reporting unit configured to report capability information of the user equipment to indicate whether the user equipment can transmit data in cells with different TDD UL/DL configurations simultaneously.

Figure 8:
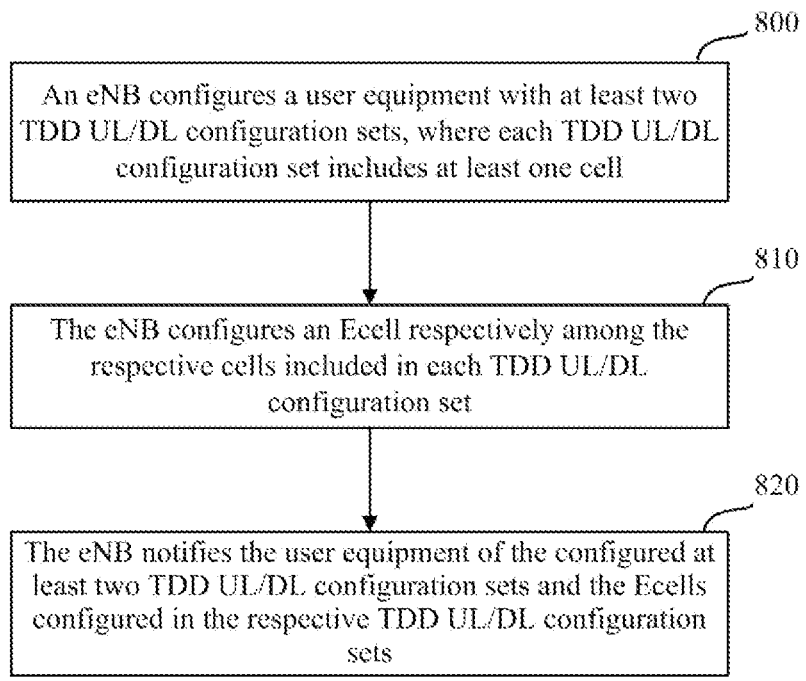
FIG. 8 and FIG. 9 are flow charts of the eNB and the user equipment transmitting data based on configured TDD UL/DL configuration sets and their corresponding Ecells according to the embodiments of the invention.

Based on the foregoing technical solution, referring to FIG. 8, a detailed flow according to an embodiment of the invention is as follows in which an eNB transmits data with a user equipment based on configured TDD UL/DL configuration sets and their corresponding Ecells:

Step 800: An eNB determines at least two TDD UL/DL configuration sets configured for a user equipment, where each TDD UL/DL configuration set includes at least one cell.

In this embodiment, preferably the respective cells belonging to the same TDD UL/DL configuration set use the same TDD UL/DL configuration, where a specific TDD UL/DL configuration is indicated by the eNB.

Figure 1:
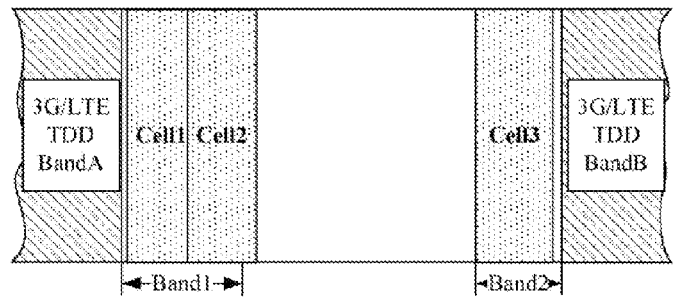
FIG. 1 is a schematic diagram of a carrier configuration of an LTE-A system in the prior art as specified in the R11 version.
Figure 2:
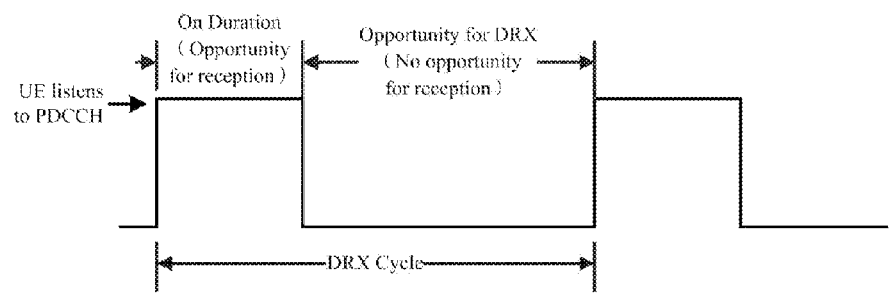
FIG. 2 is a schematic diagram of a DRX mechanism in the prior art as specified in the R10 version.
Figure 3:
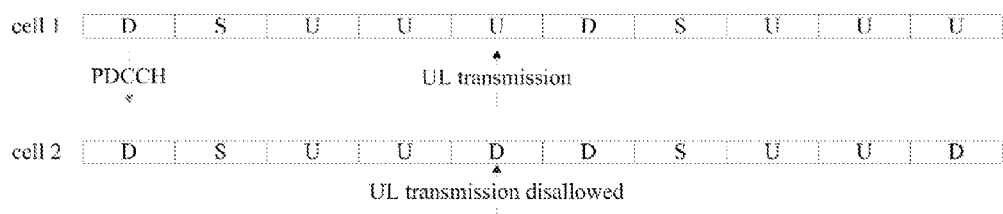
FIG. 3 is a schematic diagram of cross-carrier scheduling of an R10 LTE-A system with different TDD UL/DL configurations in the prior art.
Figure 4:
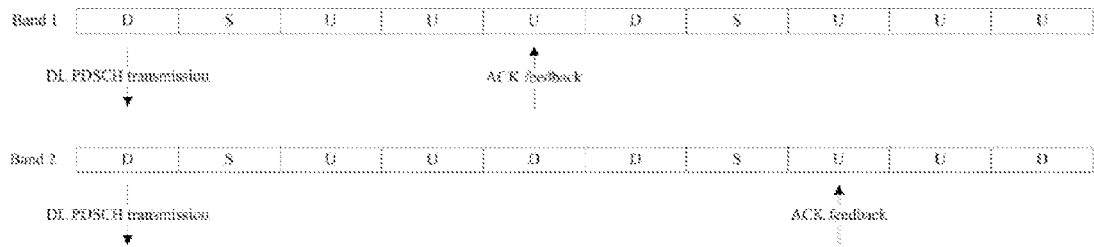
FIG. 4 is a schematic HARQ timing diagram of an R10 LTE-A system with different TDD UL/DL configurations in the prior art.

Referring to FIG. 1, for example, the eNB configures the user equipment with three cells including a cell 1, a cell 2 and a cell 3 in the LTE-A system, where the cell 1 and the cell 2 belong to the same TDD UL/DL configuration set and use the same band, i.e., Band 1, and the cell 3 belongs to another TDD UL/DL configuration set and uses a band, i.e., Band 2. In order to avoid uplink and downlink cross interference in the TDD system, the Band 1 and the adjacent 3G/LTE TDD band A have to use TDD UL/DL configurations that can coexist with each other (preferably use the same TDD UL/DL configuration), and the Band 2 and the adjacent 3G/LTE TDD Band B have to use TDD UL/DL configurations that can coexist with each other (preferably use the same TDD UL/DL configuration). If the 3G/LTE TDD Band A and the 3G/LTE TDD Band B use different TDD UL/DL configurations, then the Band 1 and the Band 2 also use different TDD UL/DL configurations.

Step 810: The eNB configures an Ecell respectively among the respective cells included in each TDD UL/DL configuration set.

The Ecell in each TDD UL/DL configuration set is determined by the eNB, and the eNB can determine the Ecell in each TDD UL/DL configuration set taking into accounts one or more of the number of cells in the TDD UL/DL configuration set, a channel quality of each cell, an interference condition in each cell, the serial numbers of the cells and other factors.

For example, if a TDD UL/DL configuration set includes only one cell, then the cell is configured as an Ecell; and if a TDD UL/DL configuration set includes at least two cells, then a cell with the highest channel quality and/or subject to the lowest interference is configured as an Ecell, where a channel quality and an interference condition can be obtained from a measurement report of the user equipment. Referring to FIG. 1, for example, if the Band 1 and the Band 2 relate respectively to two TDD UL/DL configuration sets, then for the Band 1, the eNB can determine one of the cell 1 and the cell 2 as an Ecell in the Band 1 taking into account their channel qualities, interferences and other factors, and for the Band 2, the eNB can select the only cell 3 as an Ecell in the Band 2.

Step 820: The eNB notifies the user equipment of the configured at least two TDD UL/DL configuration sets and the Ecells configured in the respective TDD UL/DL configuration sets and transmits data with the user equipment based on each Ecell over a band resource corresponding to the corresponding TDD UL/DL configuration set.

In the embodiment of the invention, the eNB can notify the user equipment of the Ecells configured in the respective TDD UL/DL configuration sets by either of the following schemes after determining the Ecells:

In an explicit notification scheme, the eNB notifies the user equipment of the ID of the Ecell in each TDD UL/DL configuration set by Radio Resource Control (RRC) signaling or Media Access Control (MAC) signaling or a broadcast.

As illustrated in FIG. 1, for example, if the Band 1 and the Band 2 relate respectively to two TDD UL/DL configuration sets, where the cell 1 is an Ecell of the Band 1, and the cell 3 is an Ecell of the Band 2, then the eNB can notify explicitly the user equipment of the serial number of the Ecell in each TDD UL/DL configuration set through RRC signaling or a broadcast, particularly as depicted in Table 2:

TABLE 2

| TDD UL/DL configuration set ID | Ecell # |
|---|---|
| TDD UL/DL configuration set 1 | Cell1 |
| TDD UL/DL configuration set 2 | Cell3 |

In a practical application, the eNB can notify the use equipment of the ID of the Ecell configured in each TDD UL/DL configuration set by RRC signaling or MAC signaling or a broadcast by sending the serial numbers of TDD UL/DL configurations in each TDD UL/DL configuration set, the ID of the Ecell in each TDD UL/DL configuration set and the IDs of the other cells in each TDD UL/DL configuration set to the user equipment by RRC signaling or a broadcast; or by sending the serial numbers of TDD UL/DL configurations in each TDD UL/DL configuration set and the ID of the Ecell in each TDD UL/DL configuration set to the user equipment by RRC signaling or a broadcast.

In an implicit notification scheme, the eNB and the user equipment predefine the use of a cell with the highest or lowest cell index in a TDD UL/DL configuration set as an Ecell, or the eNB notifies implicitly the use equipment of which of the cells is an Ecell by configuring the Ecell with some special configuration in each TDD UL/DL configuration set, that is, the eNB notifies the user equipment of an Ecell-specific configuration configured respectively for a specific cell in each TDD UL/DL configuration set by RRC signaling. As long as there is a Ecell-specific configuration, the so-called Ecell-specific configuration includes but will not be limited to one or any combination of a TDD UL/DL configuration, Hybrid Automatic Repeat Request (HARM) ACK/NACK feedback information, a Channel State Information (C SI) feedback resource configuration, a pathloss reference configuration and a random access resource configuration; and in a practical application, the invention will not be limited to these several parameters, and specific parameter contents can be configured in correspondence to a practical context, so a repeated description thereof will be omitted here.

As illustrated in FIG. 1, for example, if the Band 1 and the Band 2 relate respectively to two TDD UL/DL configuration sets, where the cell 1 is an Ecell of the Band 1, and the cell 3 is an Ecell of the Band 2, then the user equipment receives only TDD UL/DL configurations of the cell 1 and the cell 3 by RRC signaling or a broadcast, so the user equipment can determine implicitly the cell 1 as an Ecell of the Band 1 and the cell 3 as an Ecell of the Band 2. Of course, the eNB can alternatively notify the user equipment of which of the cells is an Ecell via other configurations than a TDD UL/DL configuration, for example, a CSI feedback resource configuration, a pathloss reference configuration, etc., as long as the configuration is an Ecell-specific configuration, and they will not be enumerated here.

On the other hand, the eNB can configure any TDD UL/DL configuration set and its corresponding Ecell by one or any combination of the following configuration schemes:

a: One or any combination of HARQ ACK/NACK feedback resource of each cell in the TDD UL/DL configuration set, CSI feedback resource of each cell in a TDD UL/DL configuration set, and Dedicated Scheduling Request (DSR) resource are configured on the Ecell of the TDD UL/DL configuration set.

For example, HARQ ACK/NACK feedbacks for DL transmission of all the cells in the TDD UL/DL configuration set can be transmitted over a UL carrier configured for the Ecell. A particular HARQ ACK/NACK feedback resource can be determined in compliance with what is specified in the existing physical layer standard.

Thus when a plurality of cells aggregated for the user equipment use different TDD UL/DL configurations respectively, no significant modification will be made to the existing physical layer specification as long as an original scheme to configure a PCell with an HARQ ACK/NACK feedback resource is applied directly to the Ecell, thereby simplifying an operation flow.

b: the Ecell of the TDD UL/DL configuration set is configured as a pathloss reference for uplink transmission of respective cells in the TDD UL/DL configuration set.

As illustrated in FIG. 1, for example, if the Band 1 and the Band 2 relate respectively to two TDD UL/DL configuration sets, where the cell 1 is an Ecell of the Band 1, and the cell 3 is an Ecell of the Band 2, then a downlink pathloss in the cell 1 can act as a pathloss reference for uplink transmission in the cell 2 if there is upcoming uplink transmission in the cell 2.

Thus the problem can be avoided of an inaccurate pathloss as a result of a pathloss of an active cell in a band referring to that of a cell in another band.

c: The Ecell in the TDD UL/DL configuration set is configured as a timing reference for uplink transmission of respective cells in the TDD UL/DL configuration set.

d: A TDD UL/DL configuration of the TDD UL/DL configuration set is only broadcasted on the Ecell of the TDD UL/DL configuration set, and the other cells included in the TDD UL/DL configuration set refers to the Ecell and use the same TDD UL/DL configuration.

Thus a signaling overhead can be saved effectively as compared with broadcasting a TDD UL/DL configuration in each cell.

e. Cross-carrier scheduling is limited to a TDD UL/DL configuration set, that is, cross-carrier scheduling is only allowed between respective cells in the same TDD UL/DL configuration set.

For example, an Ecell can schedule the other cells in a TDD UL/DL configuration set to which the Ecell belongs.

In another example, as illustrated in FIG. 1, if the Band 1 and the Band 2 relate respectively to two TDD UL/DL configuration sets, then the cell 1 can only be scheduled by the cell 2 belonging to the band 1 but can not be scheduled by the cell 3 if cross-carrier scheduling is configured.

Thus such a situation will not occur that different TDD UL/DL configurations for a carrier over which a Physical Downlink Control Channel (PDCCH) is borne and a carrier scheduled by that carrier so that some subframe of the scheduled carrier can not be used, thereby avoiding a resource waste.

f. Discontinuous Reception (DRX) is configured in the TDD UL/DL configuration set, and Active Times of respective cells in the TDD UL/DL configuration set are same.

As illustrated in FIG. 1, for example, if the Band 1 and the Band 2 relate respectively to two TDD UL/DL configuration sets, and generally different Radio Frequency (RF) units are used at the user equipment side for the different TDD UL/DL configuration sets, then the eNB can consider the use of common DRX per TDD UL/DL configuration set for more effective power saving, that is, Active Times of the cell 1 and the cell 2 are the same, and an Active Time of the cell 3 may be different from those of the cell 1 and the cell 2.

g. In the TDD UL/DL configuration set, a counting of an on duration listening timer (on DurationTimer), a discontinuous reception and inactivity timer (drx-InactivityTime) and a discontinuous reception and retransmission timer (drx-RetransmissionTimer) which are counted by PDCCH-subframe follows the PDCCH-subframe of the Ecell in the TDD UL/DL configuration of the TDD UL/DL configuration set.

h. In the TDD UL/DL configuration set, a radio link can be detected only in an Ecell, and if a radio link failure of the Ecell is judged, then the other cells included in the TDD UL/DL configuration set to which the Ecell belongs will not be scheduled and will be deactivated.

For example, if the Band 1 and the Band 2 relate respectively to two TDD UL/DL configuration sets, where the cell 1 is an Ecell of the Band 1, and the cell 3 is an Ecell of the Band 2, then if a radio link failure occurs in the cell 1, then since ACK feedbacks of the other cells in the Band 1 can only be transmitted in the cell 1, UL/DL data transmission will not be performed any longer in the other cells of the Band 1 once the radio link failure occurs in the cell 1.

Thus power consumption and interference arising from unnecessary data transmission can be avoided.

i. A Power Headroom Report (PHR) is maintained per TDD UL/DL configuration set, that is, a PHR MAC CE reported for a TDD UL/DL configuration set includes only a Power Headroom (PH) value in a UL carrier activated in the TDD UL/DL configuration set.

Thus such a situation can be avoided that the concept of virtual transmission has to be introduced for a cell in some TDD UL/DL configuration set when PHRs are reported for different TDD UL/DL configuration sets simultaneously, thereby simplifying an operation flow.

j. When a random access procedure is triggered in the TDD UL/DL configuration set, only the random access procedure on the Ecell is performed to thereby simplify the random access procedure.

Of course the foregoing various operations of schemes are merely exemplary and more functional operations will be bound to an Ecell as standard research continues and will not be enumerated here.

Figure 9:
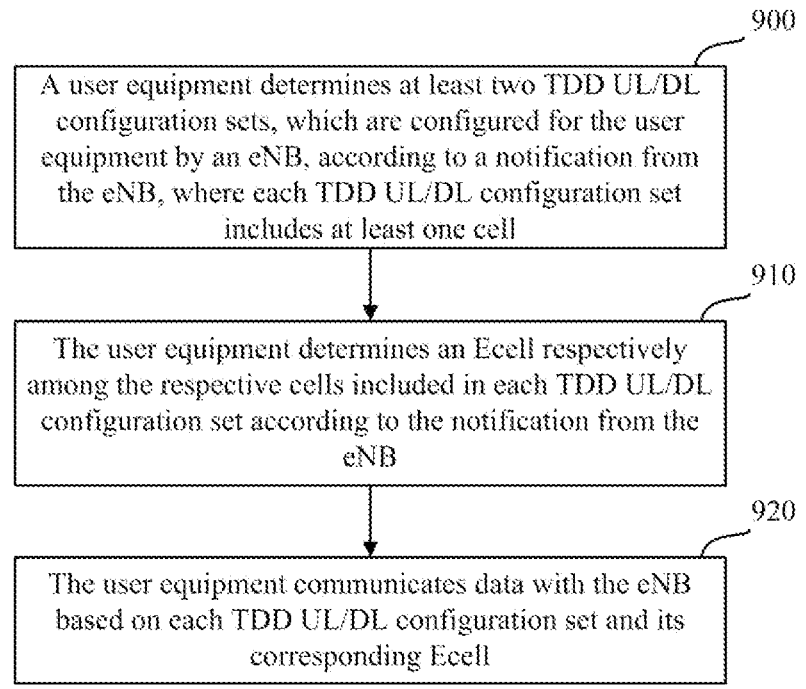

In correspondence to the foregoing embodiment, referring to FIG. 9, a detailed flow according to an embodiment of the invention is as follows in which a user equipment transmits data with an eNB based on configured TDD UL/DL configuration sets and their corresponding Ecells:

Step 900: A user equipment determines at least two time division duplex uplink and downlink, TDD UL/DL, configuration sets, which are configured for the user equipment by an eNB, according to a notification from the eNB, where each TDD UL/DL configuration set includes at least one cell.

Alike the step 800, in this embodiment, preferably the respective cells belonging to the same TDD UL/DL configuration set use the same TDD UL/DL configuration, where a specific TDD UL/DL configuration is indicated by the eNB.

Step 910: The user equipment determines an Ecell respectively among the respective cells included in each TDD UL/DL configuration set according to the notification from the eNB.

In this embodiment of the invention, the user equipment can determine the Ecells in the respective TDD UL/DL configuration sets by either of the following schemes according to a notification scheme of the eNB:

If the eNB adopts an explicit notification scheme, the user equipment determines the corresponding Ecells in the respective TDD UL/DL configuration sets of from the IDs of the Ecells carried in RRC signaling or a broadcast sent from the eNB.

The user equipment can further obtain the IDs of TDD UL/DL configurations in the respective TDD UL/DL configuration sets and the IDs of the other cells in the respective TDD UL/DL configuration sets from the RRC signaling or the broadcast sent from the eNB; or the user equipment can further obtain the IDs of TDD UL/DL configurations in the respective TDD UL/DL configuration sets from the RRC signaling or the broadcast sent from the eNB.

If the eNB adopts an implicit notification scheme, then the user equipment determines the corresponding Ecells in the respective TDD UL/DL configuration sets from an Ecell-specific configuration, carried in RRC signaling sent from the eNB, configured respectively for a cell in each TDD UL/DL configuration set. The so-called Ecell-specific configuration includes one or any combination of a TDD UL/DL configuration, an HARQ ACK/NACK feedback resource configuration, a Channel State Information (CSI) feedback resource configuration, a pathloss reference configuration, a timing reference configuration and a random access resource configuration, and these specific parameters are merely exemplary, but parameter contents will not be limited thereto.

Step 920: The user equipment transmits data with the eNB based on the respective TDD UL/DL configuration sets and their corresponding Ecells.

In the embodiment of the invention, the user equipment transmits data with the eNB based on any TDD UL/DL configuration set and its corresponding Ecell by one or any combination of the following operations in the process of the step S920:

a': One or any combination of an HARQ ACK/NACK feedback and a CSI feedback of each cell in the TDD UL/DL configuration set, and a DSR are transmitted on the Ecell of the TDD UL/DL configuration set.

Thus when a plurality of cells aggregated for the user equipment use different TDD UL/DL configurations respectively, no significant modification will be made to the physical layer specification as long as an original scheme to configure a PCell with an HARQ ACK/NACK feedback resource is applied directly to the Ecell, thereby simplifying an operation flow.

b': The Ecell in the TDD UL/DL configuration set is configured as a pathloss reference for uplink transmission of respective cells included in the TDD UL/DL configuration set.

Thus the problem can be avoided of an inaccurate pathloss as a result of a pathloss of an active cell in a band referring to that of a cell in another band.

c': The Ecell in the TDD UL/DL configuration set is configured as a timing reference for uplink transmission of respective cells included in the TDD UL/DL configuration set.

d': A TDD UL/DL configuration received on the Ecell of the TDD UL/DL configuration set is applied as a TDD UL/DL configuration of each cell in the TDD UL/DL configuration set.

Thus a signaling overhead can be saved effectively as compared with reception of a broadcasted TDD UL/DL configuration in each cell.

e'. Cross-carrier scheduling is limited to a TDD UL/DL configuration set, that is, cross-carrier scheduling is only performed in the same TDD UL/DL configuration set, and if there is cross-carrier scheduling across TDD UL/DL configuration sets, then this will be deemed as an error and will not be performed.

Thus such a situation will not occur that different TDD UL/DL configurations for a carrier over which a Physical Downlink Control Channel (PDCCH) is borne and a carrier scheduled by that carrier so that some subframe of the scheduled carrier can not be used, thereby avoiding a resource waste.

f. When applying DRX in the TDD UL/DL configuration set, each cell included in the TDD UL/DL configuration set has a same Active Time. Thus power can be saved more effectively.

g'. In the TDD UL/DL configuration set, a counting of an on DurationTimer, a drx-InactivityTime and a drx-RetransmissionTimer which are counted by PDCCH-subframe follows the PDCCH-subframe of the Ecell in the TDD UL/DL configuration of the TDD UL/DL configuration set.

h'. In the TDD UL/DL configuration set, a radio link can be detected only in an Ecell, and if there is a radio link failure of the Ecell, then the other cells are determined not to be operative any longer and will be deactivated. Thus power consumption and interference arising from unnecessary data transmission can be avoided.

i'. A PHR is maintained per TDD UL/DL configuration set.

Thus such a situation can be avoided that the concept of virtual transmission has to be introduced for a cell in some TDD UL/DL configuration set when PHRs are reported for different TDD UL/DL configuration sets simultaneously, thereby simplifying an operation flow.

j'. When a random access procedure is triggered in the TDD UL/DL configuration set, only the random access procedure on the Ecell is performed to thereby simplify the random access procedure.

Preferably the method further includes:

The user equipment reports capability information of the user equipment to indicate whether the user equipment can transmit data in cells with different TDD UL/DL configurations simultaneously.

In summary, in the embodiments of the invention, the concept of TDD UL/DL configuration set has been introduced, and also the concept of Ecell has been introduced for each TDD UL/DL configuration set, where each TDD UL/DL configuration set can include one or more cells, and there is an Ecell configured in each TDD UL/DL configuration set to have all or a part of functions of a PCell, so that the user equipment can transmit data with the eNB based on the respective TDD UL/DL configuration sets and their corresponding Ecells. Thus the Ecell can be used reasonably to thereby ensure normal operation of the user equipment and hence normal operation of the system when there are different TDD UL/DL configurations for a plurality of cells aggregated for the user equipment.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A Carrier Aggregation, CA, based data transmission method, comprising:
    an evolved NodeB, eNB, configuring a user equipment with at least two Time Division Duplex Uplink and Downlink, TDD UL/DL, configuration sets, wherein each TDD UL/DL configuration set comprises at least one cell; and
    the eNB configuring a cell respectively in each of the at least two TDD UL/DL configuration sets as an Especial Cell, Ecell;
    wherein the eNB configuring a cell in each TDD UL/DL configuration set as an Ecell comprises:
    when the TDD UL/DL configuration set comprises only one cell, then configuring the cell as an Ecell; and
    when the TDD UL/DL configuration set comprises at least two cells, then configuring a cell with a highest channel quality as an Ecell or configuring a cell subject to a lowest interference as an Ecell or configuring a cell with the highest channel quality and subject to the lowest interference as an Ecell or configuring a cell with a highest or lowest cell index as an Ecell.

2. The method according to claim 1, further comprising:
    the eNB notifying the user equipment of a TDD UL/DL configuration in each TDD UL/DL configuration set and/or the Ecell in each TDD UL/DL configuration set.

3. The method according to claim 2, wherein the eNB notifying the user equipment of the Ecell in each TDD UL/DL configuration set comprises:
    the eNB notifying the user equipment of an identity, ID, of the Ecell in the TDD UL/DL configuration set by Radio Resource Control, RRC, signaling or Media Access Control, MAC, signaling or a broadcast; or
    the eNB notifying the user equipment of Ecell-specific configuration information for the Ecell in the TDD UL/DL configuration set by RRC signaling or MAC signaling.

4. The method according to claim 3, wherein the eNB notifying the user equipment of the ID of the Ecell in the TDD UL/DL configuration set by RRC signaling or MAC signaling or a broadcast comprises:
    the eNB sending an ID of a TDD UL/DL configuration of the TDD UL/DL configuration set, the ID of the Ecell in the TDD UL/DL configuration set and IDs of the other cells in the TDD UL/DL configuration set to the user equipment by the RRC signaling or the MAC signaling or the broadcast; or
    the eNB sending an ID of a TDD UL/DL configuration corresponding to each cell and the ID of the Ecell in the TDD UL/DL configuration set corresponding to the cell to the user equipment by the RRC signaling or the MAC signaling or the broadcast.

5. The method according to claim 3, wherein the Ecell-specific configuration information comprises one or more of:
    TDD UL/DL configuration information, Channel State Information, CSI, feedback resource configuration information, Hybrid Automatic Repeat Request, HARQ, ACK/NACK feedback resource configuration information, pathloss reference configuration information, timing reference configuration information and random access resource configuration information.

6. The method according to claim 3, wherein the eNB configures each TDD UL/DL configuration set and its corresponding Ecell by one or any combination of following configuration schemes:
    one or any combination of HARQ ACK/NACK feedback resource of each cell in the TDD UL/DL configuration set, CSI feedback resource of each cell in the TDD UL/DL configuration set, and Dedicated Scheduling Request, DSR, resource are configured on the Ecell of the TDD UL/DL configuration set;
    the Ecell of the TDD UL/DL configuration set is configured as a pathloss reference for uplink transmission of each cell in the TDD UL/DL configuration set;
    the Ecell of the TDD UL/DL configuration set is configured as a timing reference for uplink transmission of each cell in the TDD UL/DL configuration set;
    a TDD UL/DL configuration of the TDD UL/DL configuration set is only broadcasted on the Ecell of the TDD UL/DL configuration set;
    cross-carrier scheduling is only allowed between cells in the same TDD UL/DL configuration set;
    Discontinuous Reception, DRX, is configured in the TDD UL/DL configuration set, and an Active Time of each cell in the TDD UL/DL configuration set is same;
    in the TDD UL/DL configuration set, a counting of an on duration listening timer, onDurationTimer, a discontinuous reception and inactivity timer, drx-InactivityTime, and a discontinuous reception and retransmission timer, drx-RetransmissionTimer which are counted by PDCCH-subframe follows the PDCCH-subframe of the Ecell;
    in the TDD UL/DL configuration set, if a radio link failure of an Ecell is judged, then the other cells comprised in the TDD UL/DL configuration set are deactivated;
    a Power Headroom Report, PHR, is maintained per TDD UL/DL configuration set; and
    when a random access procedure is triggered in the TDD UL/DL configuration set, only the random access procedure on the Ecell is performed.

7. A Carrier Aggregation, CA, based data transmission method, comprising:
    a user equipment determining at least two Time Division Duplex Uplink and Downlink, TDD UL/DL, configuration sets, which are configured for the user equipment by an eNB, according to a notification from the eNB, wherein each TDD UL/DL configuration set comprises at least one cell;
    the user equipment configuring a cell respectively in each of the at least two TDD UL/DL configuration sets as an Especial Cell, Ecell, according to the notification from the eNB or a rule predefined by the eNB and the user equipment; and
    the user equipment transmitting data with the eNB based on each of the at least TDD UL/DL configuration set and its corresponding Ecell;
    wherein when the TDD UL/DL configuration set comprises only one cell, then the cell is configured as an Ecell; and
    when the TDD UL/DL configuration set comprises at least two cells, then a cell with a highest channel quality is configured as an Ecell, or a cell subject to a lowest interference is configured as an Ecell, or a cell with the highest channel quality and subject to the lowest interference is configured as an Ecell, or a cell with a highest or lowest cell index is configured as an Ecell.

8. The method according to claim 7, wherein the user equipment configuring a cell in each TDD UL/DL configuration set as an Especial Cell, Ecell, according to the notification from the eNB or a rule predefined by the eNB and the user equipment comprises:

the user equipment configuring a cell in the TDD UL/DL configuration set as an Especial Cell, Ecell, according to an ID of the Ecell carried in Radio Resource Control, RRC, signaling or Media Access Control, MAC, signaling or a broadcast sent from the eNB; or the user equipment determining a corresponding Ecell according to Ecell-specific configuration information corresponding to the Ecell in the TDD UL/DL configuration set carried by RRC signaling or MAC signaling sent from the eNB; or the user equipment, using the rule predefined by the eNB and user equipment, regarding a cell with a highest or lowest cell index in each TDD UL/DL configuration set as an Ecell of the TDD UL/DL configuration set.

9. The method according to claim 8, wherein the user equipment further obtains an ID of a TDD UL/DL configuration in each TDD UL/DL configuration set and IDs of the cells other than the Ecell in each TDD UL/DL configuration set from the RRC signaling or the MAC signaling or the broadcast sent from the eNB; or the user equipment further obtains an ID of a TDD UL/DL configuration corresponding to each cell from the RRC signaling or the MAC signaling or the broadcast sent from the eNB.

10. The method according to claim 8, wherein the Ecell-specific configuration information comprises one or more of:

TDD UL/DL configuration information, Channel State Information, CSI, feedback resource configuration information, Hybrid Automatic Repeat Request, HARQ, ACK/JNACK feedback resource configuration information, pathloss reference configuration information, timing reference configuration information and random access resource configuration information.

11. The method according to claim 7, wherein the user equipment transmits data with the eNB based on each TDD UL/DL configuration set and its corresponding Ecell by one or more of following operations:

one or any combination of a Hybrid Automatic Repeat Request, HARQ, ACK/NACK feedback and a CSI feedback of each cell in the TDD UL/DL configuration set, and a Dedicated Scheduling Request, DSR are transmitted on the Ecell of the TDD UL/DL configuration set;

the Ecell of the TDD UL/DL configuration set is regarded as a pathloss reference for uplink transmission of each cell in the TDD UL/DL configuration set;

the Ecell of the TDD UL/DL configuration set is regarded as a timing reference for uplink transmission of each cell in the TDD UL/DL configuration set;

a TDD UL/DL configuration received on the Ecell of the TDD UL/DL configuration set is applied as a TDD UL/DL configuration of each cell in the TDD UL/DL configuration set;

cross-carrier scheduling is only performed in the same TDD UL/DL configuration set;

when applying Discontinuous Reception, DRX, in the TDD UL/DL configuration set, each cell comprised in the TDD UL/DL configuration set has a same Active Time;

in the TDD UL/DL configuration set, a counting of an on duration listening timer, onDurationTimer, a discontinuous reception and inactivity timer, drx-InactivityTime, and a discontinuous reception and retransmission timer, drx-RetransmissionTimer which are counted by PDCCH-subframe follows the PDCCH-subframe of the Ecell;

in the TDD UL/DL configuration set, if a radio link failure of an Ecell is judged, then the other cells comprised in the TDD UL/DL configuration set are deactivated;

a Power Headroom Report, PHR, is maintained per TDD UL/DL configuration set; and when a random access procedure is triggered in the TDD UL/DL configuration set, only the random access procedure on the Ecell is performed.

12. The method according to claim 7, further comprising:

the user equipment reporting capability information of the user equipment to indicate whether the user equipment can transmit data in cells with different TDD UL/DL configurations simultaneously.

13. A Carrier Aggregation, CA, based data transmission apparatus, comprising:

a first configuring unit configured to configure a user equipment with at least two Time Division Duplex Uplink and Downlink, TDD UL/DL, configuration sets, wherein each TDD UL/DL configuration set comprises at least one cell; and a second configuring unit configured to configure a cell respectively in each of the at least two TDD UL/DL configuration sets as an Especial Cell, Ecell;

wherein the second configuring unit configures a cell in each TDD UL/DL configuration set as an Ecell by, when the TDD UL/DL configuration set comprises only one cell, configuring the cell as an Ecell; and when the TDD UL/DL configuration set comprises at least two cells, configuring a cell with a highest channel quality as an Ecell or configuring a cell subject to a lowest interference as an Ecell or configuring a cell with the highest channel quality and subject to the lowest interference as an Ecell or configuring a cell with a highest or lowest cell index in the TDD UL/DL configuration set as an Ecell.

14. The apparatus according to claim 13, wherein the apparatus further comprises:

a communicating unit configured to notify the user equipment of each TDD UL/DL configuration set and the Ecell in each TDD UL/DL configuration set.

15. The apparatus according to claim 14, wherein the communicating unit notifies the user equipment of the Ecell in each TDD UL/DL configuration set by notifying the user equipment of an ID of the Ecell in the TDD UL/DL configuration set by Radio Resource Control, RRC, signaling or MAC signaling or a broadcast; or by notifying the user equipment of Ecell-specific configuration information for the Ecell in the TDD UL/DL configuration set by RRC signaling.

16. The apparatus according to claim 15, wherein the communicating unit notifies the user equipment of the ID of the Ecell in the TDD UL/DL configuration set by RRC signaling or MAC signaling or a broadcast by sending an ID of a TDD UL/DL configuration of the TDD UL/DL configuration set, the ID of the Ecell in the TDD UL/DL configuration set and IDs of the other cells in the TDD UL/DL configuration set to the user equipment by the RRC signaling or the MAC signaling or the broadcast; or by sending the ID of the TDD UL/DL configuration of the TDD UL/DL configuration set to which the cell belongs and the ID of the Ecell in the TDD UL/DL configuration set to the user equipment by the RRC signaling or the MAC signaling or the broadcast.

17. The apparatus according to claim 13, wherein the first configuring unit and the second configuring unit configure each TDD UL/DL configuration set and its corresponding Ecell by one or any combination of following configuration schemes:
- one or any combination of HARQ ACK/NACK feedback resource of each cell in the TDD UL/DL configuration set, CSI feedback resource of each cell in the TDD UL/DL configuration set, and Dedicated Scheduling Request, DSR, resource are configured on the Ecell of the TDD UL/DL configuration set;
- the Ecell of the TDD UL/DL configuration set is configured as a pathloss reference for uplink transmission of each cell in the TDD UL/DL configuration set;
- the Ecell of the TDD UL/DL configuration set is configured as a timing reference for uplink transmission of each cell in the TDD UL/DL configuration set;
- a TDD UL/DL configuration of the TDD UL/DL configuration set is only broadcasted on the Ecell of the TDD UL/DL configuration set;
- cross-carrier scheduling is only allowed between cells in the same TDD UL/DL configuration set;
- Discontinuous Reception, DRX, is configured in the TDD UL/DL configuration set, and an Active Time of each cell in the TDD UL/DL configuration set is same;
- in the TDD UL/DL configuration set, a counting of an on duration listening timer, onDurationTimer, a discontinuous reception and inactivity timer, drx-InactivityTime, and a discontinuous reception and retransmission timer, drx-RetransmissionTimer which are counted by PDCCH-subframe follows the PDCCH-subframe of the Ecell;
- in the TDD UL/DL configuration set, if a radio link failure of an Ecell is judged, then the other cells comprised in the TDD UL/DL configuration set are deactivated;
- a Power Headroom Report, PHR, is maintained per TDD UL/DL configuration set; and
- when a random access procedure is triggered in the TDD UL/DL configuration set, only the random access procedure on the Ecell is performed.

* * * * *